United States Patent Office 2,894,915
Patented July 14, 1959

2,894,915

ALUMINA PREPARATION

Carl D. Keith, Munster, Ind., assignor to Sinclair Refining Company, New York, N.Y., a corporation of Maine No Drawing. Application June 24, 1952
Serial No. 295,343

3 Claims. (Cl. 252—463)

My invention relates to improvements in the preparation of hydrous alumina, particularly for use as a base material in catalyst manufacture.

When hydrous alumina is formed from an aqueous solution of an aluminum compound by precipitation it is in the form of an amorphous hydrated material, which upon drying the freshly prepared material results in alumina monohydrate (boehmite) plus an unidentified amorphous alumina hydrate. The freshly precipitated alumina hydrate provides a particularly advantageous form of alumina precursor in catalyst manufacture because when dried and calcined to finished form after incorporation of other catalytic or promoter material it results in a base structure of fine crystallite size and high surface area. For example, the boehmite form of alumina precursor is highly desired for production of alumina-molybdenum oxide or alumina-chromia reforming catalysts.

I have found that boehmite as commonly formed in catalyst preparation is difficult and expensive to handle. Usually, it is precipitated from a solution of a water soluble aluminum compound such as aluminum chloride, aluminum sulfate or sodium aluminate as by addition of ammonia, or in the case of the last named by ammonium chloride. The precipitate is in the form of a highly gelatinous material which contains contaminating sodium or ammonium salts, for example. It is important in catalyst preparation, to remove the contaminating salts or reduce them to very low concentrations by water washing prior to incorporation of catalytically active ingredients such as molybdenum or chromium. I have found that large percentages of the desired alumina hydrate are lost by peptization when washing is conducted in the usual manner by filtration, reslurrying and refiltration. Also in the case of washing by percolation, most of the alumina hydrate peptizes and goes into colloidal suspension so that it is lost with the wash water. Moreover, washing on a continuous filter, e.g. a rotary filter, becomes exceedingly difficult because the peptized alumina hydrate in colloidal suspension clogs the filter media and makes the suspension virtually infilterable.

The form of the hydrous alumina as precipitated tends to change as the hydrogel ages. The hydrate tends to be gradually transformed from the monohydrate to a mixture of trihydrates of alumina. For many purposes, this is disadvantageous. I have discovered that by substantially saturating the aqueous medium of a slurry of boehmite or amorphous hydrous alumina with carbon dioxide the monohydrate form is stabilized so that it may be stored for long indefinite periods as such. At the same time, peptization is prevented so that washing without undue losses of alumina is greatly facilitated. Repeated washing can be employed to reduce chloride content, for example, to less than 0.5% with only minor losses of alumina. In the practice of my invention, carbon dioxide is conveniently bubbled into the wash water in an amount sufficient to saturate it under the prevailing conditions of temperature and atmospheric pressure. The solution need not be saturated in carbon dioxide although this provides a convenient safeguard that a satisfactory concentration of carbon dioxide is present. Advantageously, the pH is about five to six and a temperature of 70 to 80° F. is preferably maintained. My invention will be further described by means of the following illustrative example:

PREPARATION OF ALUMINA HYDRATE 336–75

A. *Precipitation*

The precipitations were made in a 32 gal. wooden barrel fitted with an efficient air stirrer. Due to the size of equipment it was necessary to make the precipitation in 2 batches.

The alumina hydrate was precipitated by continuously adding $1NH_4OH \cdot 1H_2O$ to a vigorously stirred solution of $AlCl_3 \cdot 6H_2O$ until ca. pH=8.25. The $NH_4OH$ solution was added by syphon at rate of about 675 ml./min. and the precipitations were completed in about 30 min. After the addition of $NH_4OH$ solution was completed, the slurries were stirred for 30 min. and the alumina hydrate was filtered from the mother liquor using a stainless steel plate and frame press.

The precipitation details are summarized below:

|  | Pptn. #1* | Pptn. #2* |
|---|---|---|
| $AlCl_3 \cdot 6H_2O$ (Mallinckrodt Analytical Reagent Grade) lbs | 25.03 | 24.82 |
| $DI \cdot H_2O$ used for $AlCl \cdot 6H_2O$ Solution, liters | 50 | 50 |
| Precipitation Time, min | 31 | 30 |
| Final pH | 8.22 | 8.25 |
| $1NH_4OH:1H_2O$ Used, liters | 19.9 | 19.9 |

*The slurries thickened up at ca. pH=5 and $NH_4OH$ addition was discontinued until stirring was efficient.

B. *Washing*

The alumina hydrate filter cake was mixed with 30 gal. of deionized water and stirred vigorously for about 1 hr. The hydrate was then filtered from the slurry using the stainless steel plate and frame press.

The resultant filter cake was broken up to about 1" pieces and placed in a 32 gal. wooden barrel fitted with a perforated false bottom (covered with a plastic screen) to distribute wash $H_2O$. Washing was started by percolation (water entered at btm. of barrel and the effluent was taken off above the hydrate bed) using 60 gals. of deionized $H_2O$/hr.

After washing a total of 201 hrs., as above, the alumina hydrate started to peptize and was being lost in the effluent wash $H_2O$. At this time the hydrate contained 2.21% Cl on an $Al_2O_3$ basis and an X-ray diffraction analysis of 110° C. dry cake indicated 32% amorphous+62% boehmite+6% gibbsite.

At this point, peptization could be inhibited by saturating the wash $H_2O$ with $CO_2$; therefore, a set up was made so that $CO_2$ could be added to the wash $HO_2$ prior to passing through the percolator.

Washing was resumed and $CO_2$ was added at such a rate that an occasional bubble of $CO_2$ passed through the $HO_2$ in percolator—this indicated that the deionized $H_2O$ was nearly saturated with $CO_2$. In a few hours the percolator effluent $H_2O$ cleared up and the alumina hydrate peptization had been stopped. Washing was continued with 60 gals. of deionized $H_2O/hr.+CO_2$ for a total of 272 hrs. At this time the deionized $H_2O$ wash rate was cut to 30 gals./hr.

After washing a total of 510 hrs., the alumina hydrate contained 0.38% Cl on an $Al_2O_3$ basis. Washing was continued (30 gals. of deionized $H_2O/hr.+CO_2$) for a total of 851.5 hrs. with no further reduction in Cl from that noted above. An X-ray diffraction analysis of 110° C. dry cake (after 851.5 hr. wash) indicated 18% amorphous+76% boehmite+6% gibbsite.

These data of the example show that the addition of carbon dioxide to alumina hydrate wash water prevents peptization of the hydrate and also inhibits conversion to alumina trihydrates.

The mechanism for this is not clear; however, since it is presumed that trihydrate formation is initiated by a solvation of alumina monohydrate, the carbon dioxide probably functions by decreasing the rate of monohydrate solvation. This may be explained by adsorption of carbon dioxide on the monohydrate crystal faces.

In the preparation of washed alumina hydrates by the slurry-filter method, it has been found necessary to add small amounts of ammonium hydroxide to the wash water so that rapid removal of Cl⁻ may be effected. I have noted however that as the Cl⁻ concentration is reduced, there is a fairly rapid transformation to trihydrate which makes handling (filtration etc.) difficult. The addition of carbon dioxide to the wash water containing ammonium hydroxide effectively inhibits this trihydrate formation and subsequent peptization.

Hence, my invention provides a convenient and inexpensive process by addition of carbon dioxide which is applicable to the preparation of alumina hydrates for any use requiring a low trihydrate concentration. In application of the process, I have observed some indication that the rate of conversion to the trihydrate form is dependent on $CO_2$ concentration, i.e. a low concentration of $CO_2$ in the wash water permits a higher concentration of alumina trihydrates in washed hydrate. A particular advantage of the process is that as applied in the above example, all trihydrate is present as gibbsite which provides a means for obtaining gibbsite seeds for use in subsequent hydrate preparations aimed at producing gibbsite type catalyst base materials.

I claim:

1. In the production of hydrous alumina by precipitation from an aqueous solution of a soluble aluminum compound, the method of preventing peptization and of stabilizing the hydrate in the form of alumina monohydrate which comprises contacting with carbon dioxide gas an aqeuous suspension of hydrous alumina including hydrous alumina corresponding to the monohydrate form upon drying.

2. In the production of hydrous alumina from an aqueous solution of a soluble aluminum compound by precipitation, the method of washing the precipitated hydrous alumina including hydrous alumina corresponding to the monohydrate form upon drying which comprises contacting the precipitate with water substantially saturated with carbon dioxide.

3. A stabilized aqueous suspension of hydrous alumina corresponding to the monohydrate form upon drying which consists essentially of a suspension of the hydrous alumina in water which has been substantially saturated with carbon dioxide.

References Cited in the file of this patent

UNITED STATES PATENTS

| | | |
|---|---|---|
| 2,008,112 | Seailles | July 16, 1935 |
| 2,033,374 | Gayer | Mar. 10, 1936 |
| 2,419,272 | Marisic et al. | Apr. 22, 1947 |
| 2,456,268 | Gibbs et al. | Dec. 14, 1948 |